MACHINE READABLE MERCHANDISE TAG

Filed Dec. 14, 1966

INVENTOR.
Paul H. Hamisch
BY
Wood, Herron and Evans
ATTORNEYS

United States Patent Office 3,409,760
Patented Nov. 5, 1968

3,409,760
MACHINE READABLE MERCHANDISE TAG

Paul H. Hamisch, Dayton, Ohio, assignor to The Monarch Marking System Company, Dayton, Ohio, a corporation of Ohio

Filed Dec. 14, 1966, Ser. No. 601,683
5 Claims. (Cl. 235—61.12)

Figure 2:
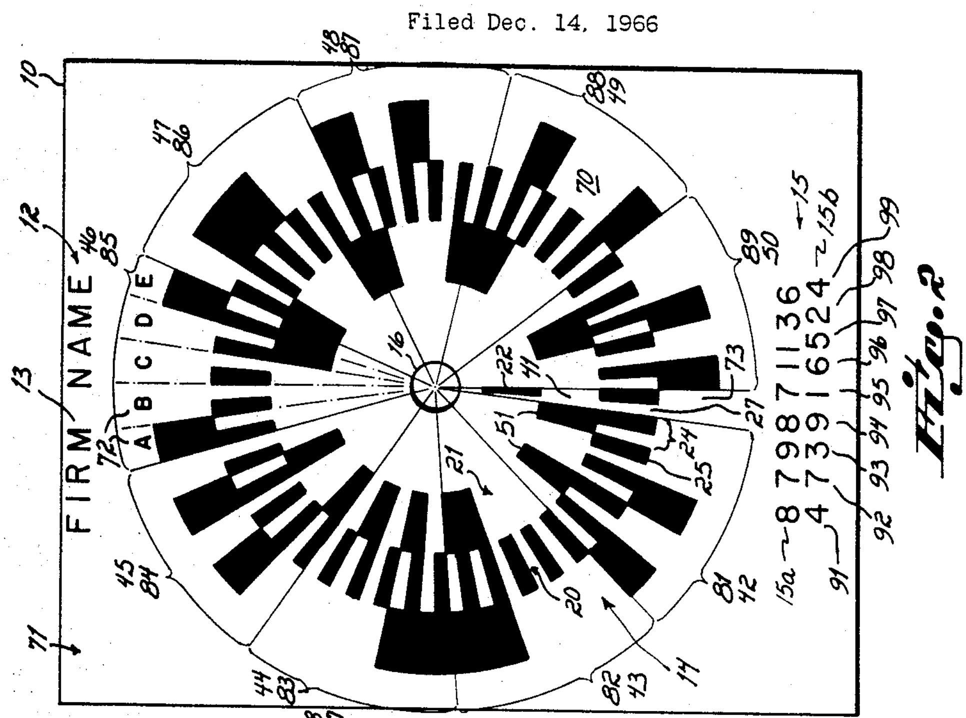

This invention relates to tags and labels, and more particularly to merchandise tags and labels which bear imprinted machine readable characters such as price, inventory number and the like, and which, when used with suitable tag reading devices, permit the automation of such functions as inventory control, purchase price collection, and sales data accumulation.

An example of the general type of tag or label to which this invention is directed is disclosed and claimed in the co-pending application of Herbert La Mers, for "Interpreting System," Ser. No. 260,748, filed Feb. 25, 1963. In the above-identified La Mers application, a tag is shown which embodies a construction fundamentally different from that employed in machine readable tags and labels previously known in the art. The La Mers tag is predicated upon the concept of providing a tag with a central alignment hole about which are imprinted concentric circular patterns of photosensible machine readable characters. The circular patterns contain both timing data for use in synchronizing the tag reading operation, and coded information relating to price and the like for use in automating inventory control, purchase price collection, and other similar functions.

The merit of the La Mers tag is that the need for careful alignment of the tag and reader is practically nonexistent. With the prior art tags, before readout of a tag is possible, it is first necessary to carefully and painstakingly align the tag with the transducers of the reader. This is particularly burdensome in high volume operations as, for example, in supermarkets where machine readable price tags are used to automate the check-out operation. In such an application, if careful alignment is a requisite to reading the price of, for example, 50–100 items per customer, the check-out operation will be productive of intolerable delays which at best anger patrons if not causing them to discontinue their patronization altogether.

With the La Mers tag, the alignment problem is virtually eliminated. It is only necessary to insert a probe, which protrudes from the reader, into the hole in the tag. The particular annular orientation of the tag and the probe is not important. The essence, therefore, of the La Mers tag, as it appears in hindsight, is merely the provision of a hole in the center of concentrically arranged photosensible marks. It is this hole that is responsible for the marked simplicity afforded by the tag.

The La Mers tag, because of the utterly simple manner with which it can be aligned with the reader, represents a revolutionary advance in the machine readable tag field. However, such a result has not been without some compromise. Specifically, the La Mers tag has been found to pose somewhat of a problem from the standpoint of the overall ease with which various coded entries can be imprinted on the tag concentric in circles. Stated differently, with La Mers the location of the photosensible marks for each of the coded characters is such that inherently no simple scheme exists for developing a code printer in which the print bars can be readily and easily selected, set, inked, and advanced to imprint and encode the tag. No doubt it is possible to provide a plurality of special purpose printing stamps each having the capability of producing tags with a different price or inventory number encoded thereon. However, it has not been possible to date to provide this same capability using a single printing device having a plurality of selectively positionable encoding print bars. As a consequence, the La Mers tag, while admittedly attractive in concept, is not really a commercially feasible labeling scheme, and cannot be such until the capability exists for the economical imprinting of encoded labels.

It has been, therefore, an objective of this invention to provide a machine readable tag which can be easily encoded using relatively uncomplicated printing apparatus. This objective, in accordance with the principles of this invention, has been achieved by orienting the timing and information marks of the tag in a very unique and unobvious manner relative to the concentrically arranged timing data and information circles of which they form a part. More specifically, this objective has been achieved by providing a first, or timing, circle which is divided into a plurality of contiguous timing bit positions, and a second or information ring which is similarly divided into a plurality of contiguous information bit position, the information and timing bit positions being equal in number, radially aligned, and equidistant from a centrally disposed alignment hole formed in the tag. In addition to the information and timing bit positions, a start bit position is provided which is aligned radially with one each of the information and timing bit positions at a point between the beginning and end of the encoded information.

In the preferred embodiment of this invention, a tag having a central alignment hole is provided with a forty-six bit position timing ring and, correspondingly, a forty-sit bit position information ring. The forty-six bit information ring is further sub-divided into nine character groups of five positions each, with the forty-sixth position being left blank to separate the first and last characters. The characters can be encoded in accordance with a suitable code as, for example, a two-out-of-five code, to indicate price, inventory number, or the like. The timing ring positions each contain a timing mark or bit. One of the timing bits is radially aligned with both the start bit and the blank information bit position, and in combination therewith provides a signal to the reader indicating the start of the encode information. The remaining forty-five timing bits are radially aligned with different ones of the nine five-bit character groups, providing the reader with timing signals for each information bit position, and thereby synchronizing the scanning operation.

It has been a further objective of this invention to provide a machine readable merchandise tag which can also be read by prospective customers unfamiliar with the system used to encode the characters of the tag information ring. To this end, a tag has been provided having, in addition to the concentric timing and information rings, a plurality of character zones located outside the concentric rings. The character zones correspond in number and content to the coded characters of the information ring, except that the characters in the character zones are humanly intelligible in contrast to the two-out-of-five code format. For example, if the nine characters of the information ring are encoded to represent both a price of $8.79 and an inventory number of 871136, the character zones bear the humanly intelligible Arabic numerals 879871136. Thus, a visual indication of both the price and the inventory number is provided.

Figure 1:
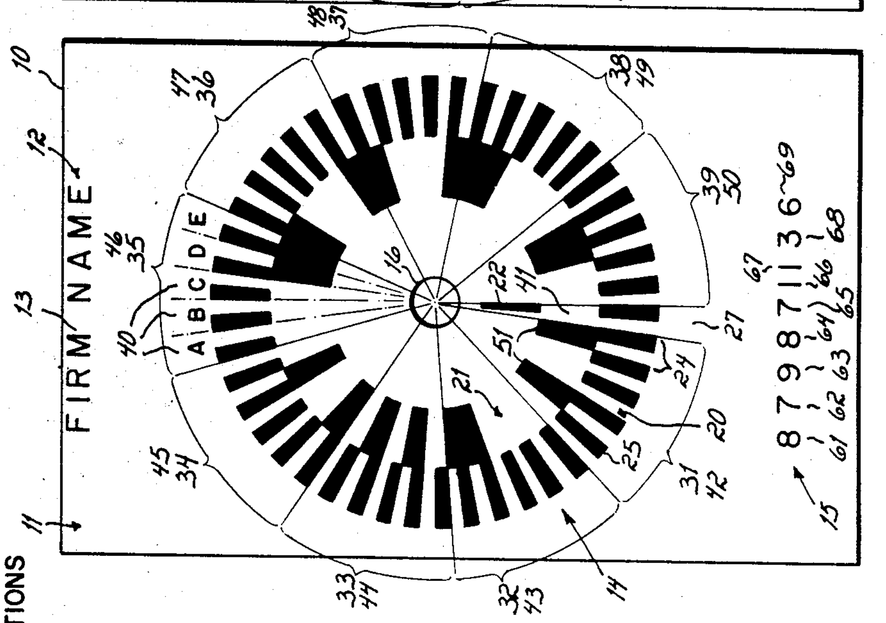
Figure 3:
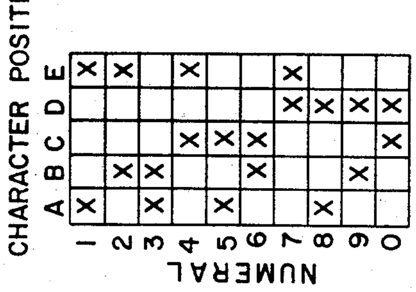

Other objectives and advantages of this invention will be more readily apparent from a detailed description of the invention taken in conjunction with the accompanying drawings in which:

FIGURE 1 is a plan view of one preferred embodiment of a tag constructed in accordance with the principles of this invention, FIGURE 2 is a plan view of a second preferred embodiment of a tag constructed in accordance with the principles of this invention, and FIGURE 3 is an encoding chart suitable for use in conjunction with coding the various characters of the tag.

A first preferred embodiment of the tag, as shown more particularly in FIGURE 1, includes a rectangular sheet of printing stock 10 consitituting the body of a tag which is generally indicated by the numeral 11. The printing stock 10 is provided with a surface 12 which is adapted to receive imprints of a firm or company name 13, coded machine readable timing data and information 14, and a humanly intelligible translation of the encoded information 15. The printing stock 10, which forms the body of the tag 11, is preferably constructed of paper stock although other materials may be used such as light gauge metals, wood strips, plastic sheets and the like. The printing surface 12 is preferably integral with the printing stock 10. However, it is contemplated that the printing surface 12 may comprise, for example, a thin lamination of paper adhered to a suitable support material or substrate such as wood, plastic, metal or the like, the lamination and substrate in combination comprising the tag. Alternatively, the printing surface 12 may comprise a print receptive surface on the merchandise itself or on a package in which the merchandise is contained.

The firm name 13 and the humanly intelligible translation of the encoded information 15 provided, respectively, on upper and lower portions of the tag 11 may be omitted under certain conditions. For example, if it becomes necessary to reduce the size of the tag to a minimum, the firm name 13 and translation 15 may be omitted, and the length of the tag 11 reduced until the tag is substantially square in shape. Typically, a tag such as that shown in FIGURE 1, which includes the firm name 13 and the translation 15, is approximately one inch wide by one and three-eighths inches long.

Also included in the preferred embodiment of the tag 11 is an aligner 16. The aligner 16 preferably is a through hole, although it may be in the form of a blind hole, depression or dimple which does not extend through the printing stock 10. The function of the aligner 16 is to engage a suitably positioned probe associated with the tag reader for the purpose of orienting and aligning the machine readable characters 15 with the character sensing transducers of the reader.

The machine readable characters 14 include a timing ring 20, an information ring 21 and a start mark or bit 22. The timing ring or circle 20 is centered about the aligner 16 and is divided into forty-six equally circumferentially spaced contiguous timing bit or mark positions 24, each of which contains a photosensible timing bit or mark 25. Because the timing ring 20 is centered about the aligner 16, the timing bits or marks 25 are equidistant from the aligner 16. The forty-six timing marks 25 include a start timing mark 27 which is radially aligned with the start mark 22. The start timing mark 27, in combination with the start mark 22, establish a time reference for the tag reading operation. Specifically, the coincidence along a single radial line of the start mark 22 and the start timing mark 27, and the absence of a bit along the same radial line in the information ring 21, is detected by the reader using conventional coincidence detection apparatus such as coincidence gates, and once detected can be used to generate a start signal. The remaining forty-five timing marks 25 are sub-divided into nine groups of five marks each, the groups being indicated by the numerals 31–39. The five bits of each of the groups 31–39, when transduced by the reader, are usable in any conventional manner to provide timing and synchronization for scanning the contents of the information ring 21.

The information ring 21, like the timing ring 20, is divided into forty-six equally circumferentially spaced and contiguous information bit positions 40. The information bit positions 40 are radially aligned with the timing bit positions 24. The information bit position 41 aligned with the start bit 22 and the start timing bit 27 is left blank for reasons to be described. The remaining forty-five information bit positions 40, like the timing marks 25, are divided into nine character groups 42–50. The bits 40 of the character groups 42–50 are radially aligned with the timing bits 25 of the timing groups 31–39, respectively, thereby providing one timing bit for each bit of the information ring 21. The provision of one timing bit 25 for each information bit position 40 enables the tag scanning operation to be properly synchronized.

The character groups 42–50 are encoded by placing photo-sensible marks 51 in the various information bit positions 40 as dictated by the particular code being used. Preferably, the coding chart depicted in FIGURE 3 is utilized. The coding scheme represented by the chart is a two-out-of-five code having a two bit parity checking characteristic. In the preferred coding system depicted in FIGURE 3, the five information bit positions 40 have positional significance in the sense that the positions 40 of each character group 42–50 are weighted. Specifically, the first character position A of each group is assigned a value 1, the second character position B of each group is assigned a value 2, the third character position C of each group is assigned a value 4, the fourth character position D of each group is assigned a value 7, and the fifth character position of each group is assigned a value of 0, this fifth position being a parity check position useful for a purpose to be described.

If, for example, it is desired to encode a group with the number 1, a photosensible mark is placed in the bit position A and in the bit position E. Similarly, if a character group is to be encoded with the number 2, a mark is placed in the second bit position B and the fifth bit position E. In any given character group the value of the number encoded is equal to the sum of the values associated with those bit positions in which marks are placed, except for the number 0 which is encoded by placing a mark in positions C and D. Thus, a character group encoded with the number 3 has marks in the first and second bit positions A and B, the weighted sum of which equals 3. Similarly, a character group encoded with the numeral 8 has marks in the first and fourth positions A and D corresponding to a 1 and 7, the sum of which is the encoded number 8. The timing marks 25, the start mark 22, and the information marks 51 contrast optically with the print surface 12 of the stock 10. Preferably the marks 25 are black, contrasting in color with a white or light colored print surface 12.

As those skilled in the art will understand, it is not necessary that all nine character groups 42–50 be encoded. Nor is it necessary that character groups be encoded in accordance with the particular two-out-of-five code of FIGURE 3. It is contemplated that other encoding arrangements may be used such as conventional binary wherein the positions A, B, C, D, and E of each code group correspond to the weighted binary positions 1, 2, 4, 8, and 16, respectively. Further, it is not necessary that the encoding be strictly numerical. Alphabetical coding or alphanumerical coding may be used. Finally, it is not necessary that the information ring 21 be divided into nine five-bit characters. Other character groupings are possible such as fifteen three-bit characters, five nine-bit characters, etc.

An advantage, however, of using the code depicted in FIGURE 3 is that it has inherent error-checking properties. Specifically, since each encoded numeral has two and only two bit positions marked, errors in the nature of omitted or additional marks in a character group can be detected. For example, if one of the two marks has been omitted or additional marks added, the total number of marks per character group does not equal two. Such errors are easily detected using well-known parity checking techniques such as counting the marks in each character group and producing an error signal should be the total number of marks per group not equal two.

The humanly intelligible translation 15 of the coded information ring 21 is divided into nine juxtaposed character positions 61–69. The character positions 61–69 correspond to the nine character groups 42–50 of the information ring 21. Assuming the number 879871136 is encoded in the character groups 42–50, the character position 61–69 will contain, as shown in FIGURE 1, the Arabic numeral 879871136. Thus, a humanly intelligible translation of the information included in the ring 21 is provided by placing the Arabic numerals in the various character position 61–69 of the translation 15.

A second preferred embodiment of a tag constructed in accordance with the principles of this invention is depicted in FIGURE 2 in which like numerals are utilized to represent like elements of FIGURE 1. The tag 71 of the second embodiment, like the tag 11 of the first embodiment includes a sheet of printing stock 10 having an aligner 16 and a print surface 12 upon which is imprinted the firm name 13, the machine readable characters 14 including the start bit 22, the first information ring 21, the timing ring 20 and the humanly intelligible translation 15 of the encoded information. In addition to these elements, which are common to the tag 11 of FIGURE 1, the tag 71 of FIGURE 2 further includes a second or outer information ring 70 and an additional group of character positions **15*b* for translating the second information ring 70**.

The information ring 70, like the information ring 21 of FIGURE 1, is divided into forty-six information bit positions 72 which are equally circumferentially spaced and contiguous, as well as aligned with the timing bit positions 24 and the information bit positions 40. An information bit position 73 of the ring 70 is aligned with the start bit 22, and the start timing bit 27, is left blank for reasons to be described. The remaining forty-five information bit positions 72 are divided into nine groups 81–89, each having five information bit positions. The five information bit positions of each of the nine character groups 81–89 may be encoded in accordance with the two-out-of-five code of FIGURE 3 in a manner similar to that described with respect to information ring 21. That is, the five information bit positions of each group 81–89 are assigned values of 1, 2, 4, 7, and 0. Encoding of a given character is accomplished by providing marks in two and only two of the information bit positions of each of the character groups 81–89, the sum represented by the positions of the two marks constituting the number encoded, except in the case of a zero.

The humanly intelligible translation of the information encoded in information ring 70 is provided in a set **15*b* of character positions 91–99 arranged horizontally below the set 15*a* of character positions 61–69 corresponding to the information ring 21. The character positions 91–99 are adapted to receive humanly intelligible representations of the characters encoded in the character groups 81–89, respectively. For example, if the character groups 81–89 of the information ring 70 are encoded with the numerals 473916524, the character positions 91–99** will bear the Arabic numerals 473916524, respectively, as shown in FIGURE 2.

An advantage of leaving blank the position 41 of the information ring 21 of tag 11 and the information bit positions 41 and 73 of the information rings 21 and 70 of tag 71 is that when a tag is properly encoded there is nowhere on the tag a continuous radial line extending from the innermost radius of the timing mark 22 to the outermost radius of the information ring 70. Since such a continuous radial line is not found on a properly encoded tag, if such a line is detected it indicates that the tag is either improperly coded or that there is a stray radial line such as a pencil mark on the tag. By providing the tag reader with a coincidence circuit for detecting the coincidence of a mark in the rings 70, 20, and 21, and the ring defined by the start bit 22, it is possible to detect stray pencil marks in the form of radial lines as well as improperly coded tags.

In practice, the tags 11 and 71 are preferably provided with the aligner 16 and the imprinted timing ring 20 when manufactured. The information rings 21 and 70 and the humanly intelligible translation 15 of the coded information are left blank to be filled in by the user at a later date. The firm name 13, if provided on the tag, preferably is imprinted at the time of tag manufacture although it may be imprinted at the time the tag is coded.

A reader suitable for use in reading the encoded tags of this invention is disclosed and claimed in the copending application to Paul H. Hamisch and Jack I. Kern, for "Encoded Tag Reader," Ser. No. 601,689, filed Dec. 14, 1966, the entire disclosure of which is incorporated herein by reference. Briefly, the reader includes a probe projecting from the reader housing, and a plurality of photosensing transducers. The photosensing transducers are mounted for movement in concentric circular paths centered about the probe, the paths being coincident with the rings 70, 29, 21, and the ring defined by the start bit 22. In operation, the tip of the probe is moved into engagement with the aligner 16 of the tag and the tag then moved into photosensing relationship with the transducers. Movement of the tag into photosensing relationship with the transducers effectively drives the probe into the reader housing. When the tag is properly positioned for reading, the probe is driven into the housing a distance sufficient to trip a switch which initiates the operation of a motor. The motor drives the transducers in circular paths, thereby sequentially sensing the timing, information and start bits.

Specifically, the transducers are driven in circular paths scanning the respective rings 70, 20 and 21, and the ring defined by the start bit 22. When the transducers are aligned with the radial line defined by the start bit 22 and the start timing bit 27, a start signal is generated by the reader which functions to condition the storage devices of the reader for storing the information bit and characters which are subsequently sensed. As the transducers continue to revolve in their respective circular paths the characters 81–89 and 42–50 are sensed, the sensing being serial by bit as well as serial by character. When the reader has completed at least one revolution and sensed the fifth position E of each of the last characters 89 and 50 of the character groups 81–89 and 42–50, respectively, the reader discontinues further processing of the sensed characters in response to the detection, for the second time, of the coincidence of start bit 22 and the start timing bit 27.

An advantage of the tag of this invention, in addition to making tag printing a commercially feasible proposition, is that it drastically reduces the problem of aligning the tag with the reader. Furthermore, since the tag contains its own series of timing bits and start-stop command signals, the tag is completely self-contained, requiring no extrinsic timing or command signal source for synchronizing the scanning operation.

From the above disclosure of the general principles of the present invention and the detailed description of a preferred embodiment, those skilled in the art will readily comprehend various modifications to which the invention is susceptible. Accordingly, I desire to be limited only by the scope of the following claims.

Having described my invention, I claim:

1. A tag adapted to be read by a reader having a probe and a plurality of photo-transducers each mounted for scanning movement in a different concentric circular path centered about said probe, said tag comprising:

a sheet of printing stock having a print receptive surface thereon, a first plurality of information mark positions, said positions being located on said print receptive surface of said tag and adapted to receive photosensible information marks, a plurality of photosensible timing marks imprinted on and optically contrasting with said print receptive surface of said tag, said timing marks being equal in number to the number of said information mark positions and arranged in a circular pattern concentric with said information mark pattern for synchronously generating timing signals during the scanning of said information positions, a start mark imprinted on and optically contrasting with said print receptive surface of said tag, said start mark being offset from the center of said concentric circular patterns, and an aligner located at the center of said patterns, said aligner being engageable with said probe for aligning said concentric circular reader scanning paths with said respective concentric circular timing and information patterns and start mark, thereby facilitating tag reading of said marks by said phototransducers.

2. The tag of claim 1 further comprising a second plurality of information mark positions located on said print receptive surface of said tag, said second plurality of information mark positions being adapted to receive encoded photosensible information marks, being arranged in a circular pattern concentric with said timing mark and first information mark patterns, and being aligned with one of said circular scanning paths for reading by one of said photo-transducers.

3. The tag of claim 1 wherein said start mark is aligned with one of said timing marks for establishing in combination therewith a unique angular reference position relative to said concentric patterns of marks for separating the beginning and end of a circular encoded information pattern.

4. The tag of claim 1 wherein said aligner is a through hole.

5. The tag of claim 3 wherein said aligner is a through hole and further including a plurality of humanly intelligible character positions located without said circular patterns and adapted to receive a humanly intelligible translation of encoded information without obscuring said photosensible information, timing, and start marks.

No references cited.

DARYL W. COOK, *Primary Examiner.*